(12) United States Patent  
Jovicevic (10) Patent No.: US 8,740,247 B1
(45) Date of Patent: Jun. 3, 2014

(54) AIRBAG ASSEMBLY (71) Applicant: Nissan North America, Inc., Franklin, TN (US)

(72) Inventor: Niko Jovicevic, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 11 days.

(21) Appl. No.: 13/727,905

(22) Filed: Dec. 27, 2012

(51) Int. Cl.
*B60R 21/231* (2011.01)

(52) U.S. Cl.
USPC ............. 280/743.1; 280/730.2; 280/743.2

(58) Field of Classification Search
USPC ................. 280/730.2, 743.1, 743.2
See application file for complete search history.

(56) References Cited

U.S. PATENT DOCUMENTS

| | | | |
|---|---|---|---|
| 5,544,913 A | 8/1996 | Yamanishi et al. | |
| 5,730,464 A * | 3/1998 | Hill | 280/743.2 |
| 5,797,621 A * | 8/1998 | Ono | 280/730.2 |
| 6,010,149 A | 1/2000 | Riedel et al. | |
| 6,152,481 A * | 11/2000 | Webber et al. | 280/730.2 |
| 6,164,696 A * | 12/2000 | Ellerbrok et al. | 280/743.2 |
| 6,220,629 B1 | 4/2001 | Wipasuramonton et al. | |
| 6,264,234 B1 | 7/2001 | Hill et al. | |
| 6,390,502 B1 * | 5/2002 | Ryan et al. | 280/743.2 |
| 6,431,587 B1 | 8/2002 | O'Docherty | |
| 6,883,826 B2 * | 4/2005 | Fujiwara | 280/730.2 |
| 6,916,039 B2 * | 7/2005 | Abe | 280/729 |
| 7,017,942 B2 * | 3/2006 | Elqadah et al. | 280/730.2 |
| 7,201,395 B2 | 4/2007 | Nagata et al. | |
| 7,213,834 B2 | 5/2007 | Mizuno et al. | |
| 7,264,269 B2 * | 9/2007 | Gu et al. | 280/730.2 |
| 7,314,232 B2 | 1/2008 | Kashiwagi | |
| 7,316,415 B2 * | 1/2008 | Jamison | 280/729 |
| 7,455,315 B2 | 11/2008 | Yokoyama | |
| 7,513,523 B2 * | 4/2009 | Bayley et al. | 280/730.2 |
| 7,549,670 B2 * | 6/2009 | Breuninger | 280/729 |
| 7,578,520 B2 | 8/2009 | Palo et al. | |
| 7,597,346 B2 | 10/2009 | McHugh | |
| 7,712,773 B2 * | 5/2010 | Walston | 280/730.2 |
| 7,828,322 B2 * | 11/2010 | Breuninger et al. | 280/730.2 |
| 7,845,673 B2 | 12/2010 | Kashiwagi et al. | |
| 7,954,844 B2 | 6/2011 | Kamiyama | |
| 7,997,614 B2 * | 8/2011 | Ishikawa et al. | 280/739 |
| 8,141,902 B2 * | 3/2012 | Ishikawa et al. | 280/739 |
| 8,181,989 B2 | 5/2012 | Okuhara | |
| 8,322,748 B2 * | 12/2012 | Abe et al. | 280/739 |
| 8,480,125 B1 * | 7/2013 | Belwafa et al. | 280/730.2 |
| 2003/0042716 A1 * | 3/2003 | Fujiwara | 280/730.2 |
| 2003/0218324 A1 | 11/2003 | Ju et al. | |
| 2004/0119270 A1 * | 6/2004 | Gu et al. | 280/730.2 |
| 2004/0251666 A1 | 12/2004 | Shaker et al. | |
| 2005/0082797 A1 | 4/2005 | Welford et al. | |
| 2005/0104343 A1 * | 5/2005 | Levine | 280/730.2 |
| 2007/0024031 A1 | 2/2007 | Coleman | |
| 2007/0040361 A1 * | 2/2007 | Bayley et al. | 280/730.2 |
| 2007/0108745 A1 * | 5/2007 | Belwafa et al. | 280/730.2 |
| 2007/0222192 A1 | 9/2007 | Yamagiwa et al. | |

(Continued)

*Primary Examiner* — Nicole Verley
(74) *Attorney, Agent, or Firm* — Young, Basile, Hanlon & MacFarlane, P.C.

(57) ABSTRACT

An airbag assembly for use in a vehicle includes at least one airbag panel that defines an inflatable portion and a non-inflatable portion. An external panel is connected to the at least one airbag panel at the non-inflatable portion thereof such that at least a portion of the external panel is positioned adjacent to the inflatable portion defined by the at least one airbag panel, wherein the external panel is non-inflatable.

27 Claims, 8 Drawing Sheets

(56) References Cited

U.S. PATENT DOCUMENTS

| | | | |
|---|---|---|---|
| 2008/0106072 A1* | 5/2008 | Walston et al. | 280/728.1 |
| 2008/0185823 A1 | 8/2008 | Kalliske et al. | |
| 2008/0197611 A1 | 8/2008 | Kabata | |
| 2009/0058051 A1 | 3/2009 | Hatfield et al. | |
| 2010/0253047 A1 | 10/2010 | Youn et al. | |
| 2010/0308568 A1 | 12/2010 | Okuhara | |
| 2011/0012331 A1 | 1/2011 | Kim et al. | |
| 2011/0042924 A1 | 2/2011 | Pinsenschaum et al. | |
| 2012/0001409 A1 | 1/2012 | Azuma et al. | |
| 2012/0032426 A1 | 2/2012 | Tanaka et al. | |

\* cited by examiner

AIRBAG ASSEMBLY

TECHNICAL FIELD

The disclosure relates to the field of inflatable restraints for automobiles, and more particularly, to an airbag assembly that includes a non-inflatable panel.

BACKGROUND

Inflatable restraint devices commonly called airbags are standard equipment on most new vehicles. In early implementations of airbag systems, vehicles were equipped with one or more airbags that would deploy from forward-facing regions such as the steering wheel and the passenger side of the instrument panel. In more recent implementations, additional airbags have been employed in different areas of the vehicle. For example, side-curtain airbags have been utilized to provide enhanced energy dissipation capacity along the sides of vehicles. Side-curtain airbags have been employed in areas adjacent to the roof rail and headliner or the side doors. These airbag devices are typically concealed from occupant view prior to deployment by interior trim panels associated with the roof rail and/or headliner.

When an airbag is deployed, it is inflated with a gas, which pressurizes the airbag and induces surface tension in the material from which the airbag is fabricated. To ensure that the airbag deploys correctly, guide features are sometimes provided to allow the tensioned material to move in a desired manner with respect to adjacent vehicle structures, such as trim panels, structural pillars, windows, and seats.

SUMMARY

Airbag assemblies for use in vehicles are taught herein. One aspect of the disclosed embodiments is an airbag assembly for use in a vehicle. The airbag assembly includes at least one airbag panel that defines an inflatable portion and a non-inflatable portion. An external panel is connected to the at least one airbag panel at the non-inflatable portion thereof such that at least a portion of the external panel is positioned adjacent to the inflatable portion defined by the at least one airbag panel, wherein the external panel is non-inflatable.

Another aspect of the disclosed embodiments is a vehicle that includes a vehicle structure, at least one airbag panel, and an external panel. The at least one airbag panel defines an inflatable portion and a non-inflatable portion. The external panel is connected to the at least one airbag panel at the non-inflatable portion thereof such that at least a portion of the external panel is positioned adjacent to the inflatable portion defined by the at least one airbag panel. The external panel is non-inflatable and at least a portion of the external panel is positioned between the at least one airbag panel and the vehicle structure during inflation of the inflatable portion of the at least one airbag panel.

BRIEF DESCRIPTION OF THE DRAWINGS

The description herein makes reference to the accompanying drawings wherein like referenced numerals refer to like parts throughout the several views, and wherein.

DETAILED DESCRIPTION

When an airbag of a vehicle inflates, surface tension is induced in the material that the airbag is fabricated from. The surface tension in the material can impede relative motion of the airbag with respect to adjacent vehicle structures. The disclosure herein includes an airbag assembly for use in a vehicle in which an external panel is connected to an airbag panel that has an inflatable portion. The external panel is not inflated when the inflatable portion of the airbag is inflated. As a result, less surface tension is induced in the external panel than is induced in the inflatable portion of the airbag panel. In some implementations, substantially no surface tension is induced in the external panel when the airbag is inflated. The external panel can be positioned adjacent to the inflatable portion of the airbag. In some implementations, when the airbag is deployed, the external panel is positioned between the inflatable portion of the airbag and a vehicle structure. This can, in some implementations, prevent at least part of the inflatable portion of the airbag from directly contacting the vehicle structure.

Figure 1:
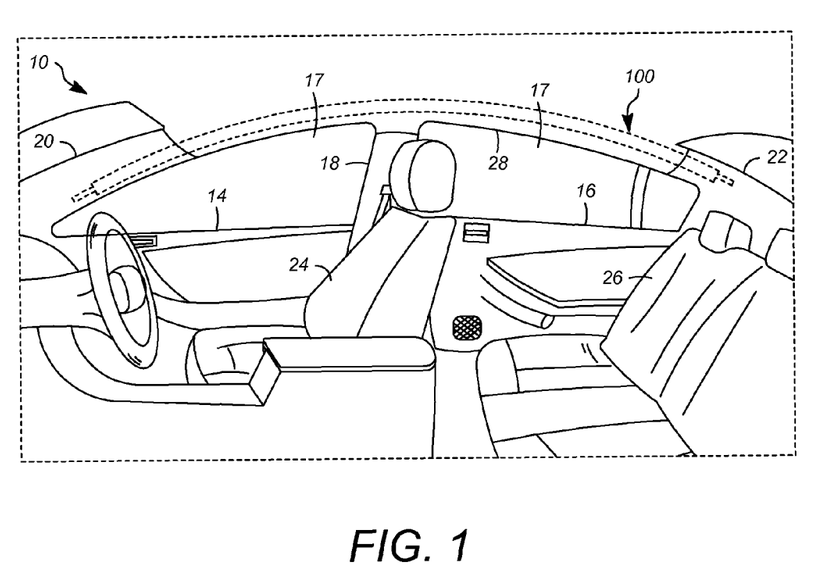
FIG. 1 is an illustration showing a vehicle equipped with an airbag assembly according to a first example.
Figure 2:
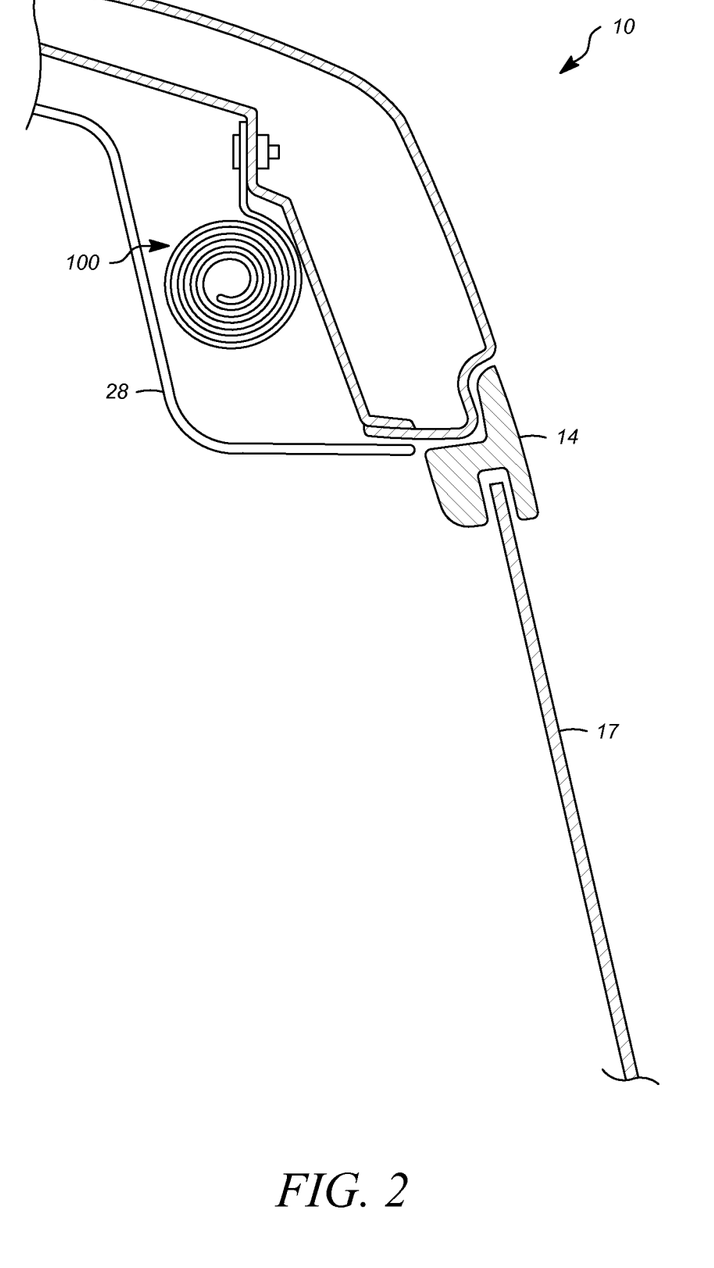
FIG. 2 is a front sectional view of the vehicle showing the airbag assembly according to the first example in a pre-deployment position.
Figure 3:
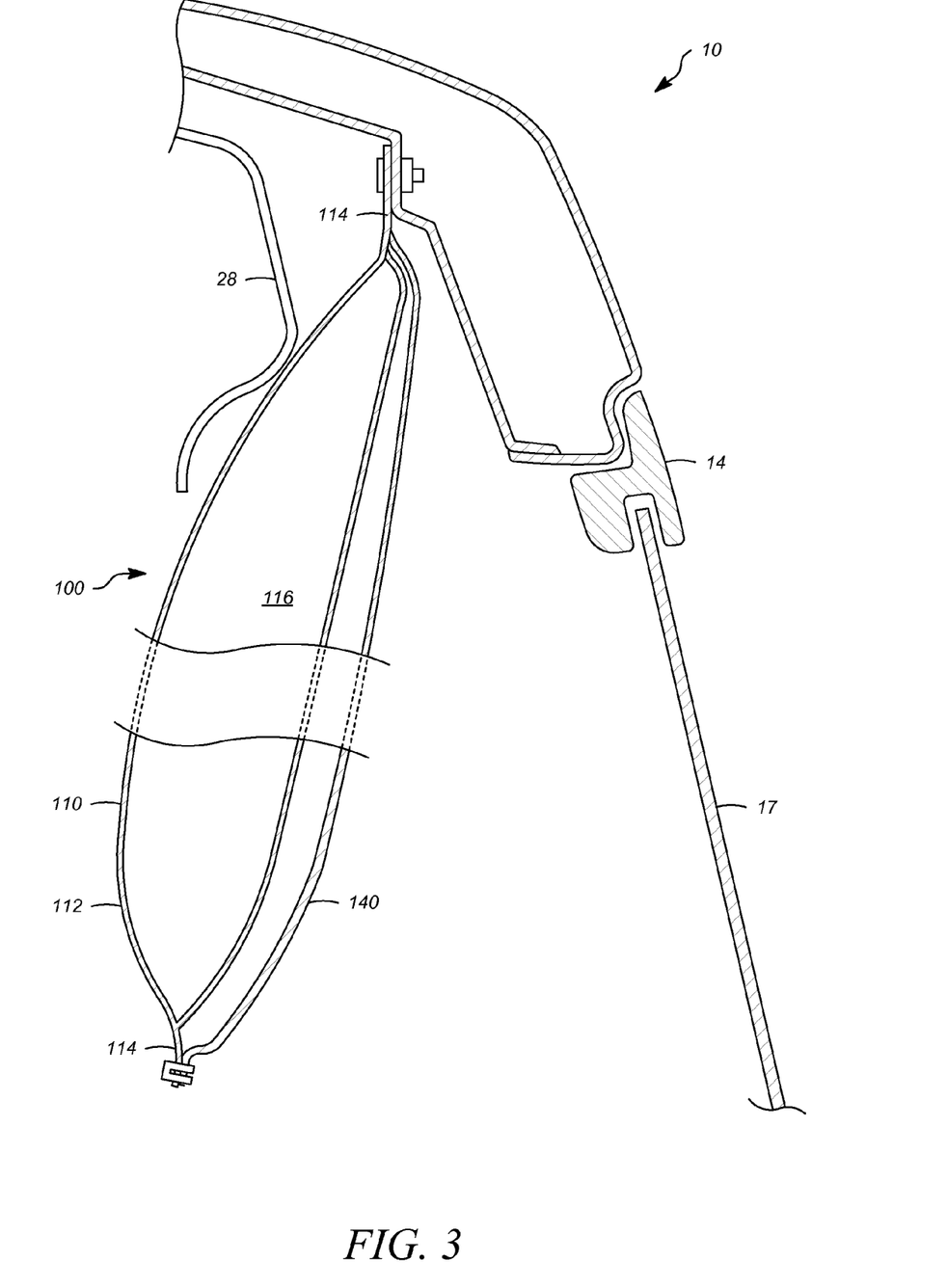
FIG. 3 is a front sectional view of the vehicle showing the airbag assembly according to the first example during deployment.

FIGS. 1-3 show a vehicle 10 having a side impact restraint system that includes an airbag assembly 100 according to a first example. The vehicle 10 may include a front door 14 and a rear door 16, each of which including one or more windows 17. The front door 14 and the rear door 16 can be separated from one another by an interior structural pillar or B-pillar 18 of the vehicle 10. A front structural pillar or A-pillar 20 is disposed forward of the front door 14. A rear structural pillar or C-pillar 22 is disposed rearward of the rear door 16. The A-pillar 20, the B-pillar 18, and the C-pillar 22 can each be covered by trim panels. Front seats 24 are positioned adjacent to the front door 14, while rear seats 26 are positioned adjacent to the rear door 16. Of course, the vehicle 10 shown and described herein is not limiting, and the airbag assembly 100 could be used with other vehicles, such as vehicles that do not include a rear door 16 but include rear seats 26, or vehicles that lack both a rear door 16 and rear seats 26.

The airbag assembly 100 is configured to be deployed upon rapid deceleration of the vehicle 10 (e.g., during an impact event or other contact between the vehicle 10 and an exterior obstacle) to restrain motion of the occupants of the vehicle 10 with respect to the vehicle 10 and to dissipate energy from the force of the impact. The vehicle 10 can include sensors, controllers, and associated hardware (not shown) that sense an impact event, determine whether to deploy the airbag assembly in response to the impact event, and cause deployment of the airbag assembly.

Prior to deployment, the airbag assembly 100 is disposed in a pre-deployment position (FIG. 2). In the pre-deployment position the airbag assembly 100 can be hidden from view within the interior the vehicle 10, such as by hiding the airbag assembly 100 behind a trim panel. The airbag can be folded, rolled, or otherwise compressed into a compact state when it is disposed in the pre-deployment position. For example, in the illustrated embodiment, the airbag assembly 100 includes or defines an inflatable curtain that is rolled and is disposed at least partially behind a headliner 28 of the vehicle 10 and extends underneath the headliner 28 along the longitudinal direction of the vehicle 10, just above the front door 14 and the rear door 16 as well as the B-pillar 18. In other implementations, the airbag assembly 100 can be located differently or configured differently. For example, the airbag assembly 100 could be utilized in a side torso airbag system or a knee airbag system.

During deployment of the airbag assembly 100 a portion of the airbag assembly 100 is inflated. Inflation of the airbag assembly 100 causes at least part of the airbag assembly 100 to enter the passenger compartment of vehicle 10. In the first illustrated example, as seen in FIG. 3, inflation of the airbag assembly 100 causes the headliner 28 to be displaced, such as by bending the headliner 28, thereby exposing the airbag assembly 100 to the passenger compartment.

The airbag assembly 100 can include an airbag panel 110 and an external panel 140 that is connected to the airbag panel 110. At least part of the airbag panel 110 is inflatable. The external panel 140 is connected to the airbag panel 110 and is non-inflatable. Because the external panel 140 is non-inflatable, a surface tension induced in the external panel 140 is less than a surface tension induced in the airbag panel 110 during inflation of the airbag panel 110. In some implementations, substantially no surface tension is induced in external panel 140 during deployment of the airbag assembly 100.

In one implementation, the airbag panel 110 and the external panel 140 can be fabricated from the same type of material. In other implementations, the airbag panel 110 and the external panel 140 can be fabricated from different types of materials.

The airbag panel 110 includes an inflatable portion 112, and can also include a non-inflatable portion 114. In some implementations, the airbag panel 110 can include multiple inflatable portions and non-inflatable portions. As an example, the inflatable portion 112 of the airbag panel 110 can be defined by two or more layers of material that define an interior space 116 that is able to contain, at least temporarily, an inflation gas. The non-inflatable portion 114 of the airbag panel 110 can be defined at the outer periphery of the airbag panel 110, where the two or more layers of material are joined together, or at other locations where the two or more layers of material are joined together.

The external panel 140 is connected to the airbag panel 110 at the non-inflatable portion 114 of the airbag panel 110, and is configured with respect to the airbag panel 110 such that the external panel 140 is positioned adjacent to the inflatable portion 114 of the airbag panel 110 when the airbag assembly 100 is deployed. In some implementations, the external panel 140 can, when deployed, be positioned between at least part of the inflatable portion 112 of the airbag panel 110 and a vehicle structure, such as the window 17 of the front door 14, to prevent at least part of the inflatable portion 112 of the airbag panel 110 from contacting the vehicle structure.

Figure 4:
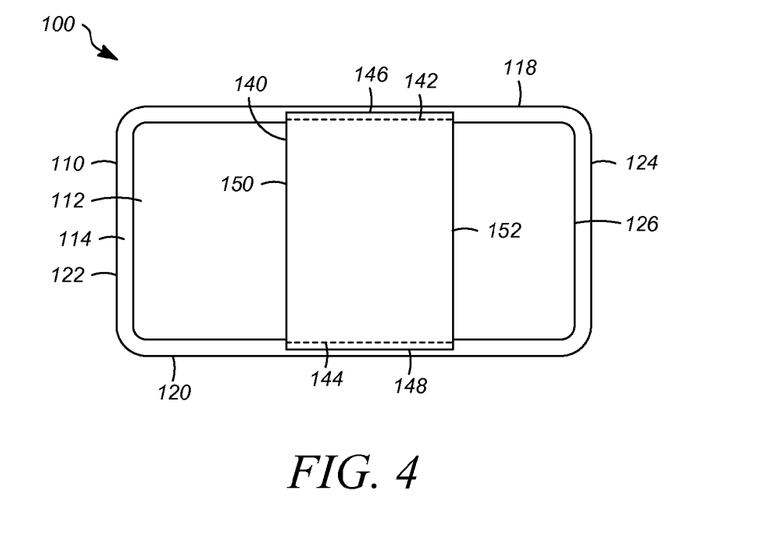
FIG. 4 is a side-view showing the airbag assembly according to the first example.

FIG. 4 is an illustration showing the airbag assembly 100. The airbag panel 110 can include an outer perimeter that surrounds the non-inflatable portion 114. In this example, the outer perimeter of the airbag panel 110 is defined by a top perimeter edge 118, a bottom perimeter edge 120, a first side perimeter edge 122, and a second side perimeter edge 124. A boundary 126 (also referred to as a first attachment) between the non-inflatable portion 114 and the inflatable portion 112 is located inward with respect to the outer perimeter of the airbag panel 110 and defines the outer perimeter of the inflatable portion 112.

The external panel 140 can be connected to the airbag panel 110 at the non-inflatable portion 114 of the airbag panel 110. In some implementations, the external panel 140 is connected to the airbag panel at first and second areas of the non-inflatable portion 114, which may be contiguous areas, or may be separate areas. For example, a first connection 142 can be located at the non-inflatable portion 114 and extend continuously along and/or adjacent to the top perimeter edge 118 of the airbag panel 110, thereby defining a top fixed edge 146 for the external panel 140. In addition, a second connection 144 can be located at the non-inflatable portion 114 and extend continuously along and/or adjacent to the bottom perimeter edge 120 of the airbag panel 110, thereby defining a bottom fixed edge 148 for the external panel 140. The first connection 142 and the second connection 144 (also referred to as a second attachment) can be or include, as examples, a sewed seam or stitches, an adhesive, hook and loop type fasteners, staples, grommets, rivets, and/or other types of fasteners.

In some implementations, including the example shown in FIG. 4, the external panel 140 is not directly connected to the airbag panel 110 at the inflatable portion 112, and instead, can be directly connected to the airbag panel 110 solely at the non-inflatable portion 114 of the airbag panel 110.

The external panel 140 of the airbag assembly 100 can define at least one free edge portion that is positioned adjacent to the inflatable portion 112 that is defined by the airbag panel 110. For example, a first free edge 150 of the external panel 140 and a second free edge 152 of the external panel 140 can be disposed opposite one another and can each extend from the first fixed edge 146 of the external panel 140 to the second fixed edge 148 of the external panel 140. In some implementations, a length of the external panel 140 between the first free edge 150 and the second free edge 152 in a front to rear direction of the vehicle 10 is less than a length of the airbag panel 110 in the front to rear direction of the vehicle 10.

To reduce surface tension in the external panel 140 during inflation of the airbag panel 110, a material length of the external panel between the first connection 142 and the second connection 144 can be greater than a material length of the airbag panel 110 between the first connection 142 and the second connection 144.

Figure 5:
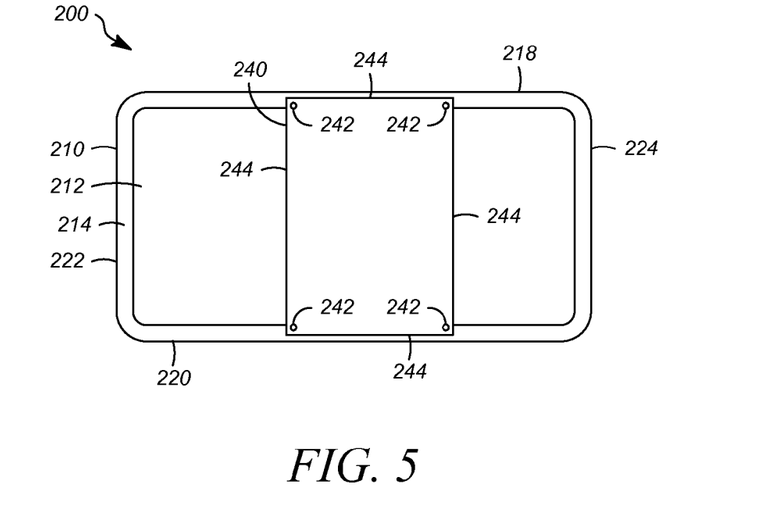
FIG. 5 is a side-view showing an airbag assembly according to a second example.

FIG. 5 is an illustration showing an airbag assembly 200 according to a second example. The airbag assembly 200 includes an airbag panel 210 having an inflatable portion 212 and a non-inflatable portion 214. In this example, the outer perimeter of the airbag panel 210 is defined by a top perimeter edge 218, a bottom perimeter edge 220, a first side perimeter edge 222, and a second side perimeter edge 224. The airbag assembly 200 is similar in construction to the airbag assembly 100, except that the external panel 240 is connected to the airbag panel 210 by connecting structures 242, which can include any of the types of connectors previously described, that are positioned at discrete locations of the external panel 240, such as corners, and do not extend continuously. Thus, the external panel includes a plurality of free edges 244, and need not include fixed edges. This type of connection can be applied to any of the examples shown herein, and airbag assemblies can include both continuously extending connections and non-continuously extending connections at discrete locations.

Figure 6:
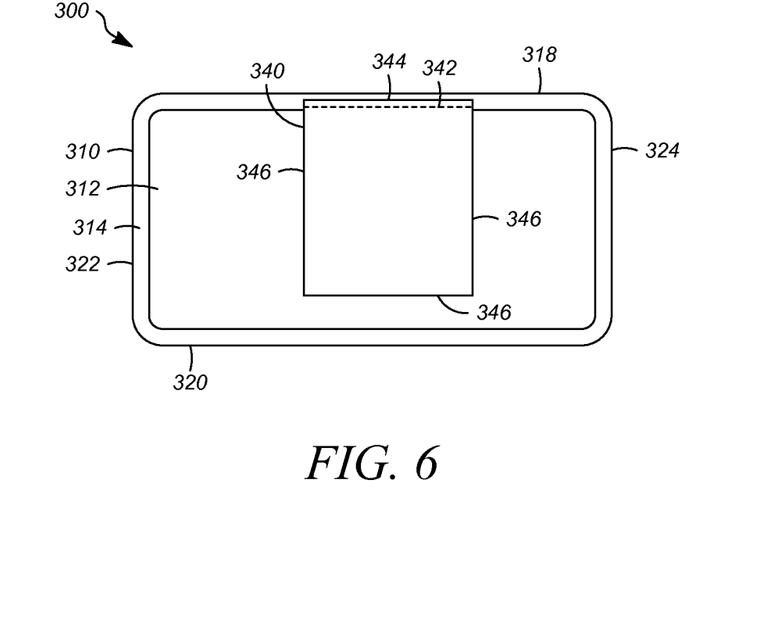
FIG. 6 is a side-view showing an airbag assembly according to a third example.

FIG. 6 is an illustration showing an airbag assembly 300 according to a third example. The airbag assembly 300 includes an airbag panel 310 having an inflatable portion 312 and a non-inflatable portion 314. In this example, the outer perimeter of the airbag panel 310 is defined by a top perimeter edge 318, a bottom perimeter edge 320, a first side perimeter edge 322, and a second side perimeter edge 324. The airbag assembly 300 is similar in construction to the airbag assembly 100, except that the external panel 340 is connected to the airbag panel 310 only by a first connection 342 that extends continuously adjacent to one of the perimeter edges, which in this example is the top perimeter edge 318. Thus, the external panel 340 includes a fixed edge 344 that is adjacent to the top perimeter edge 318 of the airbag panel 310, and a plurality of free edges 346.

Figure 7:
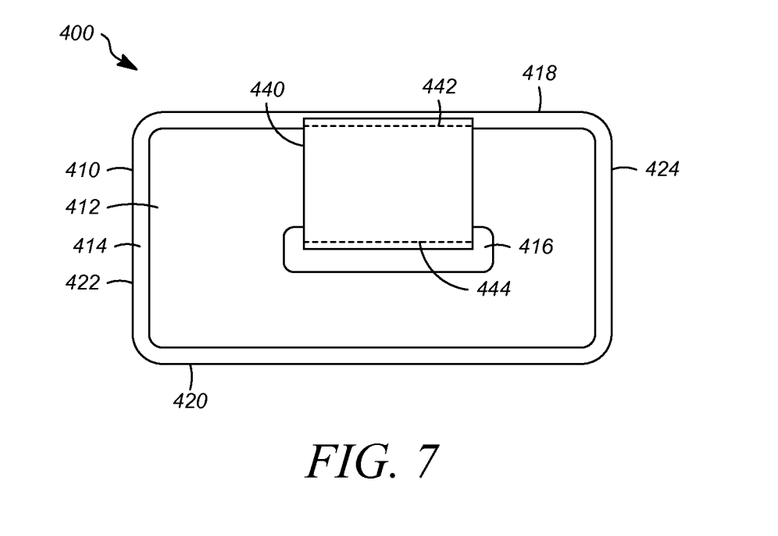
FIG. 7 is a side-view showing an airbag assembly according to a fourth example.

FIG. 7 is an illustration showing an airbag assembly 400 according to a fourth example. The airbag assembly 400 includes an airbag panel 410 having an inflatable portion 412 and a non-inflatable portion that is defined by a first non-inflatable area 414 and a second non-inflatable area 416. In this example, the outer perimeter of the airbag panel 410 is defined by a top perimeter edge 418, a bottom perimeter edge 420, a first side perimeter edge 422, and a second side perimeter edge 424. The first non-inflatable area 414 is located adjacent to at least one of the perimeter edges, such as the top perimeter edge 418, and can, in some implementations, surround the inflatable portion 412, as described in connection with the airbag panel 110. The second non-inflatable area 416 is surrounded by the inflatable portion 412 off the airbag panel 410.

The airbag assembly 400 is similar in construction to the airbag assembly 100, except that the external panel 440 is connected to the airbag panel 410 by a first connection 442 located in the first non-inflatable area 414 adjacent to the top perimeter edge 418, and a second connection 444 located in the second non-inflatable area 416, which is surrounded by the inflatable portion 412.

Figure 8:
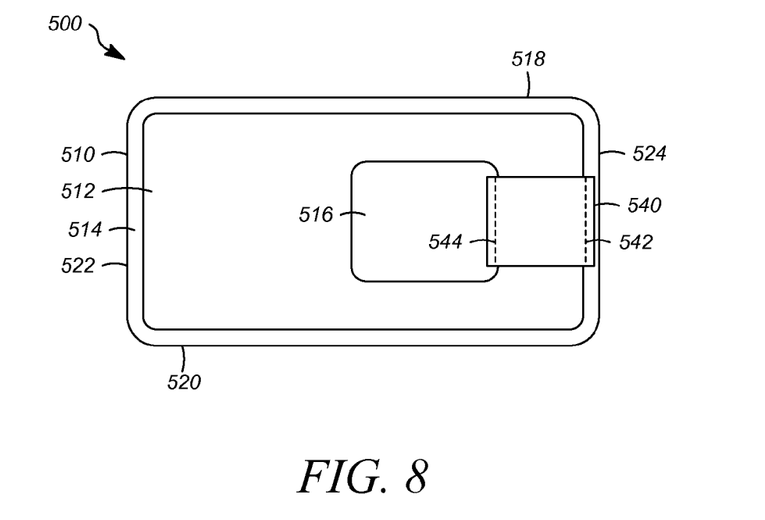
FIG. 8 is a side-view showing an airbag assembly according to a fifth example.

FIG. 8 is an illustration showing an airbag assembly 500 according to a fifth example. The airbag assembly 500 includes an airbag panel 510 having an inflatable portion 512 and a non-inflatable portion that is defined by a first non-inflatable area 514 and a second non-inflatable area 516. In this example, the outer perimeter of the airbag panel 510 is defined by a top perimeter edge 518, a bottom perimeter edge 520, a first side perimeter edge 522, and a second side perimeter edge 524. The first non-inflatable area 514 is located adjacent to at least one of the side perimeter edges, such as the second side perimeter edge 524, and can, in some implementations, surround the inflatable portion 512, as described in connection with the airbag panel 510. The second non-inflatable area 516 is surrounded by the inflatable portion 512 off the airbag panel 510.

The airbag assembly 500 is similar in construction to the airbag assembly 100, except that the external panel 540 is connected to the airbag panel 510 by a first connection 542 located in the first non-inflatable area 514 adjacent to the second side perimeter edge 524, and a second connection 544 located in the second non-inflatable area 516, which is surrounded by the inflatable portion 512.

Figure 9:
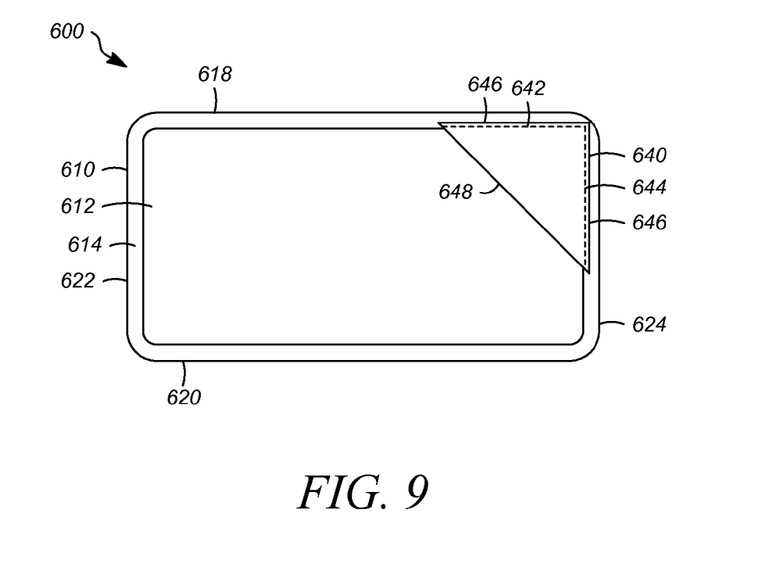
FIG. 9 is a side-view showing an airbag assembly according to a sixth example.

FIG. 9 is an illustration showing an airbag assembly 600 according to a sixth example. The airbag assembly 600 includes an airbag panel 610 having an inflatable portion 612 and a non-inflatable portion 614. In this example, the outer perimeter of the airbag panel 610 is defined by a top perimeter edge 618, a bottom perimeter edge 620, a first side perimeter edge 622, and a second side perimeter edge 624. The non-inflatable portion 614 is located adjacent two or more of the side perimeter edges, such as the top perimeter edge 618 and the second side perimeter edge 624, and can, in some implementations, surround the inflatable portion 612, as described in connection with the airbag panel 610.

The airbag assembly 600 is similar in construction to the airbag assembly 100, except that the external panel 640 is connected to the airbag panel 610 by a first connection 642 and a second connection 644 that are located along respective ones of a pair of adjacent perimeter edges of the airbag panel 610, such as the top perimeter edge 618 and the second side perimeter edge 624. The external panel can define fixed edges 646 at the first connection 642 and the second connection 644, and can define one or more free edges 648. In the illustrated example, the external panel 640 is substantially triangular.

Figure 10:
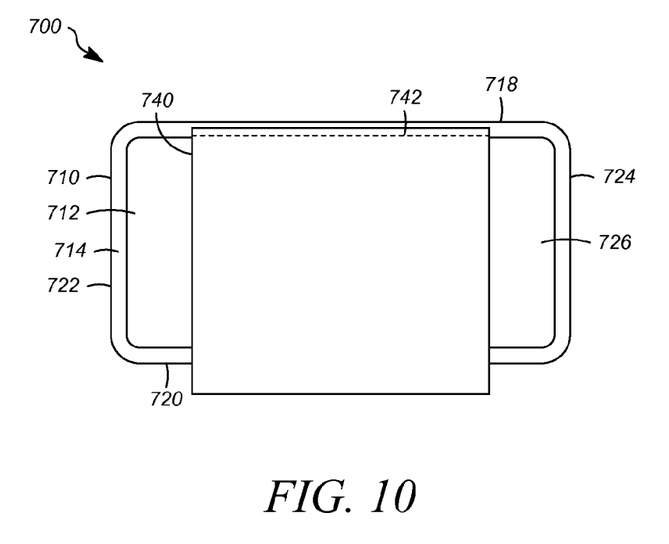
FIG. 10 is a side-view showing an airbag assembly according to a seventh example.
Figure 11:
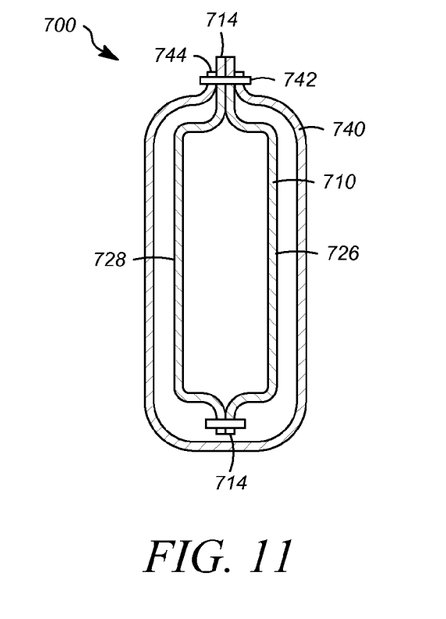
FIG. 11 is front sectional view showing the airbag assembly according to the seventh example.

FIGS. 10-11 are illustrations showing an airbag assembly 700 according to a seventh example. The airbag assembly 700 includes an airbag panel 710 having an inflatable portion 712 and a non-inflatable portion 714. In this example, the outer perimeter of the airbag panel 710 is defined by a top perimeter edge 718, a bottom perimeter edge 720, a first side perimeter edge 722, and a second side perimeter edge 724. The non-inflatable portion 714 is located adjacent one or more of the side perimeter edges, such as the top perimeter edge 718. The external panel 740 extends around the airbag panel 710, such that it is adjacent to a first side 726 of the airbag panel 710 and a second side 728 of the airbag panel 710. The external panel 740 is connected to the airbag panel 710 at a first connection 742 on the first side 726 of the airbag panel 710 and at a second connection 744 on the second side 728 of the airbag panel 710. The first connection 742 and the second connection 744 can both be located in the non-inflatable portion 714 of the airbag panel 710, and can both be located adjacent to the top perimeter edge 718 of the airbag panel 710.

Figure 12:
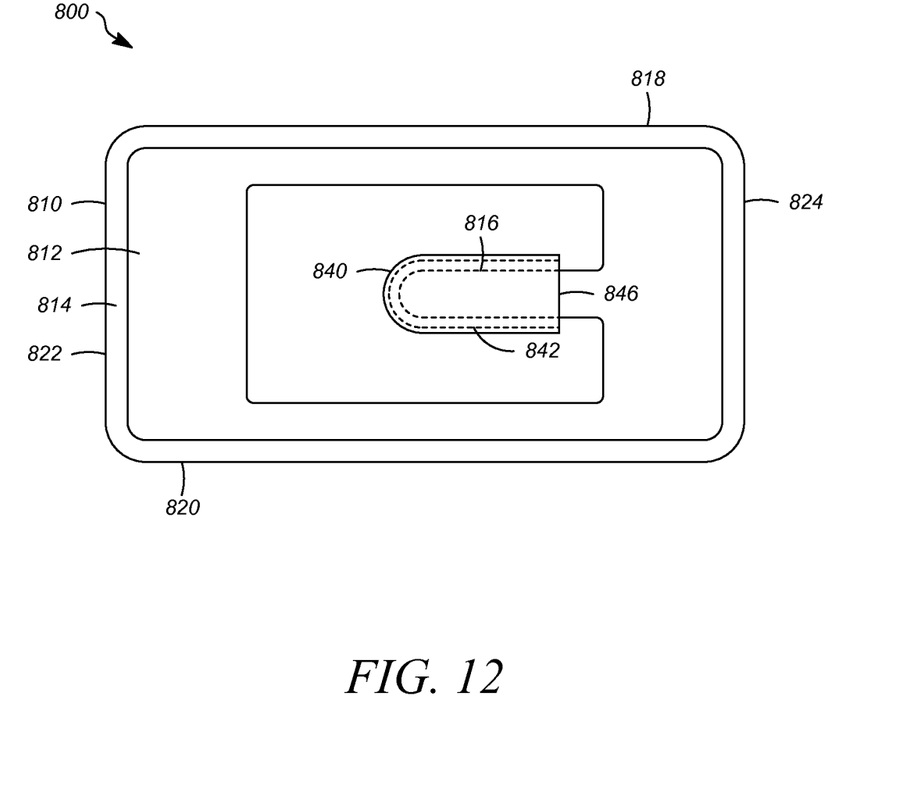
FIG. 12 is a side-view showing an airbag assembly according to an eighth example.

FIG. 12 is a side-view showing an airbag assembly 800 according to an eighth example. The airbag assembly 800 includes an airbag panel 810 having an inflatable portion 812 and a non-inflatable portion 814. In this example, the outer perimeter of the airbag panel 810 is defined by a top perimeter edge 818, a bottom perimeter edge 820, a first side perimeter edge 822, and a second side perimeter edge 824. The non-inflatable portion 814 is separated from the perimeter edges by the inflatable portion 812, such that the non-inflatable portion 814 is surrounded by the inflatable portion 812. The external panel 840 is positioned adjacent to a portion of the inflatable portion 812, such as a protruding portion 816 that protrudes into the non-inflatable portion 814. The external panel 840 is connected to the airbag panel 810 in the non-inflatable are 814 by at least a first connection 842. In the illustrated example, the first connection 842 extends continuously around the protruding portion 816 of the inflatable portion 812, and defines a structure that is shaped like a pocket and has a free edge 844 that is disposed adjacent to the protruding portion 816 of the inflatable portion 812.

In operation, the airbag assemblies described herein are deployed by inflating at least a portion of the airbag panel of the airbag assembly. During deployment, the external panels of the airbag assemblies described herein are disposed adjacent to at least a portion of the airbag panel, and can be disposed between an inflatable portion of the airbag panel and a vehicle structure.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An airbag assembly for use in a vehicle, comprising:
at least one airbag panel that includes an inner panel layer that is connected to an outer panel layer at a first attachment, wherein the first attachment at least partially defines an inflatable portion and a non-inflatable portion; and
an external panel that is connected to the at least one airbag panel at a second attachment that is spaced apart from the first attachment and is located on the non-inflatable portion of the at least one airbag panel such that at least a portion of the external panel is positioned adjacent to the inflatable portion defined by the at least one airbag panel, wherein the external panel is non-inflatable.

2. The airbag assembly of claim 1, wherein the external panel defines at least one free edge portion that is positioned adjacent to the inflatable portion defined by the at least one airbag panel.

3. The airbag assembly of claim 1, wherein the external panel is not directly connected to the at least one airbag panel at the inflatable portion thereof.

4. The airbag assembly of claim 1, wherein the external panel is connected to the at least one airbag panel such that a surface tension induced in the external panel is less than a surface tension induced in the at least one airbag panel during inflation of the inflatable portion defined by the at least one airbag panel.

5. The airbag assembly of claim 1, wherein the external panel is connected to the at least one airbag panel at a first location and a second location, wherein a material length of the external panel between the first location and the second location is greater than a material length of the at least one airbag panel between the first location and the second location.

6. The airbag assembly of claim 1, wherein the non-inflatable portion defined by the at least one airbag panel includes a first non-inflatable area and a second non-inflatable area, at least part of the inflatable portion defined by the at least one airbag panel is positioned between the first non-inflatable area and the second non-inflatable area, and the external panel is connected to the at least one airbag panel at the first non-inflatable area and the second non-inflatable area.

7. The airbag assembly of claim 6, wherein the first non-inflatable area is located adjacent to a first perimeter edge of the at least one airbag panel and the second non-inflatable area is located adjacent to a second perimeter edge of the at least one airbag panel.

8. The airbag assembly of claim 7, wherein the first perimeter edge is a top perimeter edge and the second perimeter edge is a bottom perimeter edge.

9. The airbag assembly of claim 7, wherein at least one of the first perimeter edge or the second perimeter edge is a side perimeter edge.

10. The airbag assembly of claim 7, wherein the first perimeter edge is at least one of a top perimeter edge or a bottom perimeter edge and the second perimeter edge is a side perimeter edge.

11. The airbag assembly of claim 6, wherein at least one of the first non-inflatable area or the second non-inflatable area is surrounded by the inflatable portion defined by the at least one airbag panel.

12. The airbag assembly of claim 6, wherein the first non-inflatable area is surrounded by the inflatable portion defined by the at least one airbag panel and the second non-inflatable area is a perimeter edge of the at least one airbag panel.

13. The airbag assembly of claim 1, wherein a length of the external panel in a front to rear direction of the vehicle is less than a length of the at least one airbag panel in the front to rear direction of the vehicle.

14. The airbag assembly of claim 1, wherein the external panel includes a first edge that is connected to the non-inflatable portion defined by the at least one airbag panel, a second edge that is connected to the non-inflatable portion defined by the at least one airbag panel, and a third edge that extends from the first edge to the second edge, and at least a portion of the third edge is positioned adjacent to the inflatable portion defined by the at least one airbag panel.

15. The airbag assembly of claim 1, wherein the external panel is connected to the non-inflatable portion defined by the at least one airbag panel at a first location on a first side of the at least one airbag panel and at a second location on a second side of the at least one airbag panel.

16. The airbag assembly of claim 1, wherein the at least one airbag panel and the external panel are fabricated from different materials.

17. The airbag assembly of claim 1, wherein the first attachment is a sewn connection between the inner panel layer and the outer panel layer.

18. The airbag assembly of claim 1, wherein the second attachment is a sewn connection between the at least one airbag panel and the external panel.

19. The airbag assembly of claim 1, wherein the second attachment is spaced outwardly from the first attachment with respect to the inflatable portion of the at least one airbag panel.

20. The airbag assembly of claim 1, wherein the second attachment connects the inner panel layer, the outer panel layer and the external panel.

21. A vehicle, comprising:
a vehicle structure;
at least one airbag panel that defines an inflatable portion and a non-inflatable portion; and
an external panel that is connected to the at least one airbag panel at the non-inflatable portion thereof such that at least a portion of the external panel is positioned adjacent to the inflatable portion defined by the at least one airbag panel, wherein the external panel is non-inflatable, at least a portion of the external panel is positioned between the at least one airbag panel and the vehicle structure during inflation of the inflatable portion of the at least one airbag panel, and the external panel defines at least one free edge portion that is positioned adjacent to the inflatable portion defined by the at least one airbag panel.

22. The vehicle of claim 21, wherein the external panel is connected to the at least one airbag panel such that a surface tension induced in the external panel is less than a surface tension induced in the at least one airbag panel during inflation of the inflatable portion defined by the at least one airbag panel.

23. The vehicle of claim 21, wherein the external panel is connected to the at least one airbag panel at a first location and a second location, wherein a material length of the external panel between the first location and the second location is greater than a material length of the at least one airbag panel between the first location and the second location.

24. The vehicle of claim 21, wherein the non-inflatable portion defined by the at least one airbag panel includes a first non-inflatable area and a second non-inflatable area, at least part of the inflatable portion defined by the at least one airbag panel is positioned between the first non-inflatable area and the second non-inflatable area, and the external panel is connected to the at least one airbag panel at the first non-inflatable area at a first location that is spaced apart from a first boundary portion between the first non-inflatable area and the inflatable portion and the second non-inflatable area at a second location that is spaced apart from a second boundary portion between the second non-inflatable area and the inflatable portion.

25. The vehicle of claim 21, wherein the external panel is not directly connected to the at least one airbag panel at the inflatable portion thereof.

26. The vehicle of claim 21, wherein a length of the external panel in a front to rear direction of the vehicle is less than a length of the at least one airbag panel in the front to rear direction of the vehicle.

27. The vehicle of claim 21, wherein the external panel includes a first edge that is connected to the non-inflatable portion defined by the at least one airbag panel and a second edge that is connected to the non-inflatable portion defined by the at least one airbag panel, wherein the at least one free edge extends from the first edge to the second edge.

* * * * *